United States Patent [19] [11] 3,920,837
Schmidt-Dunker et al. [45] Nov. 18, 1975

[54] METHOD OF TREATMENT OF CALCIUM DISORDERS USING CYCLOHEXANE-HEXACARBOXYLIC ACID

[75] Inventors: Manfred Schmidt-Dunker, Dusseldorf; Walter Plöger, Hilden Rhld.; Karl-Heinz Worms; Helmut Blum, both of Dusseldorf; Christian Gloxhuber, Haan Rhld., all of Germany

[73] Assignee: Henkel & Cie GmbH, Dusseldorf-Holthausen, Germany

[22] Filed: Aug. 20, 1974

[21] Appl. No.: 498,999

[30] Foreign Application Priority Data
Aug. 27, 1973 Germany.............................. 2343197

[52] U.S. Cl................................... 424/317; 424/49
[51] Int. Cl.² ......................................... A61K 31/19
[58] Field of Search .................................... 424/317

[56] References Cited
OTHER PUBLICATIONS
Chemical Abstracts 71:101409m (1969).

*Primary Examiner*—Norman A. Drezin
*Attorney, Agent, or Firm*—Hammond & Littell

[57] ABSTRACT

A method for the treatment of diseases relating to the abnormal deposition or dissolution of difficultly soluble calcium salts in the body or mouths of warm-blooded animals which consists of administering orally, parenterally or topically to said warm-blooded animals, a safe but effective amount of at least one pharmacologically acceptable cyclohexane-hexacarboxylic acid derivative selected from the group consisting of cyclohexane-1,2,3,4,5,6-hexacarboxylic acid and water-soluble salts thereof.

3 Claims, No Drawings

METHOD OF TREATMENT OF CALCIUM DISORDERS USING CYCLOHEXANE-HEXACARBOXYLIC ACID

A number of diseases are known in human and veterinary medicine which are associated primarily or partly with the abnormal deposition or dissolution of difficulty soluble calcium salts in the animal body. These diseases can be divided into two categories:

1. Abnormal depositions of difficultly soluble calcium salts, mostly calcium phosphate, cause bone malformations, pathological hardening of tissues and secretions in organs;

2. The abnormal dissolution of hard tissues causes losses of hard bone substance, which cannot be replaced or only by incompletely crystallized tissue. This dissolution is frequently accompanied by pathologically high calcium and phosphate concentrations in the plasma.

In the first category belong diseases like arthritis, neuritis, bursitis, tendinitis, and other inflammatory diseases where the deposit of calcium phosphate is enhanced in the respective body parts. Hyperparathyroidism caused by hormonal disorders can, in combination with hypercalcemia, produce a calcium deposit in many organs. Myositis ossificans (fibrodysplasia) leads to progressive ossification of the musculature, and in Bechterew's disease, a typical inflammatory disorder of the bone joint system, progressive calcification leads to an ossification of the entire vertebral system.

Particularly frequent among the diseases of the first category is arteriosclerosis, where calcification of the aorta and of the arteries appears as a rule in the progressive stage. Furthermore, calculi of all kinds belong here, like kidney stones, gall stones, bladder stones and sialolith (tartar). Even though these stones do not consist completely of calcium phosphate, a calcium phosphate deposit can be assumed in most cases as a nucleus.

To the second category of diseases belong hereditary hypophosphatasia as well as osteoporosis, where there is insufficient reformation of bone substance for various reasons (senile, menopausal, caused by treatment with drugs like steroids, or by diseases, like arthritis). Furthermore, this group comprises Paget's disease (Osteitis deformans) where the dissolution of normal bone substance is accompanied by reformation of soft, only slightly crystallized tissue, as well as Osteodystrophia fibrosa generalisata, a systemic disease with irregular bone disintegration.

A number of these diseases appear relatively frequently in human, as well as in veterinary medicine. A completely satisfactory therapy for these diseases has not yet been described, though controlled diets, treatment with fluorides, phosphates or condensed phosphates, with sex hormones, and particularly with the hormone calcitonin have been suggested and also used. In the last years the treatment of some of these diseases with phosphonates has been suggested.

It has also been suggested to add chemical substances to oral hygiene products and dentrifices in order to prevent the deposit and cause the dissolution of the difficultly soluble calcium salts known as tartar. Such deposits are frequently removed by mechanical means. As chemically active agents, compounds like ethylene diamine tetraacetic acid or nitrilo-triacetic acid have been added to toothpastes, mouthwashes or special ointments. While these toothpastes and mouthwashes serve primarily for the prophylactic treatment of tartar formation, special ointments, which are applied to the teeth and remain there for some time, have the function of removing the tartar or at least making it easier to remove. But these products have not been greatly used in practice so far, because they must meet a number of different features. First, such cosmetic preparations must be pharmacologically harmless, particularly since they can also be accidentally swallowed. The agents should prevent the formation of tartar without destroying the tooth structure. Besides, they must not cause any irritation of the gums or of the mucous membrane of the mouth.

An object of the present invention is the development of therapeutic methods and pharmacological preparations which may be utilized in the treatment of the above conditions.

Another object of the present invention is the development of a method for the treatment of diseases relating to the abnormal deposition or dissolution of difficulty soluble calcium salts in the body or mouths of warm-blooded animals which consists of administering orally, parenterally or topically to said warm-blooded animals, a safe but effective amount of at least one pharmacologically acceptable cyclohexane-hexacarboxylic acid derivative selected from the group consisting of cyclohexane-1,2,3,4,5,6-hexacarboxylic acid and water-soluble salts thereof.

A further object of the present invention is the development of a pharmaceutical composition consisting essentially of a minor amount of at least one pharmacologically acceptable cyclohexane-hexacarboxylic acid derivative selected from the group consisting of cyclohexane-1,2,3,4,5,6-hexacarboxylic acid and water-soluble salts thereof, and a major amount of pharmacologically acceptable excipients.

These and other objects of the present invention will become more apparent as the description thereof proceeds.

It was found that cyclohexane-hexacarboxylic acid or its water-soluble salts are suitable for the therapeutic treatment of disorders of calcium or phosphate metabolism and of diseases caused by them. The new pharmaceutical or cosmetic products for influencing the deposition and dissolution of difficultly soluble calcium salts are, therefore, characterized by the fact that they contain as an active substance cyclohexane-1,2,3,4,5,6-hexacarboxylic acid or its water-soluble salts.

More particularly, therefore, the present invention relates to a method for the treatment of diseases relating to the abnormal deposition or dissolution of difficultly soluble calcium salts in the body or mouths of warm-blooded animals which consists of administering orally, parenterally or topically to said warm-blooded animals, a safe but effective amount of at least one pharmacologically acceptable cyclohexane-hexacarboxylic acid derivative selected from the group consisting of cyclohexane-1,2,3,4,5,6-hexacarboxylic acid and water-soluble salts thereof; as well as a pharmaceutical composition consisting essentially of a minor amount of at least one pharmacologically acceptable cyclohexane-hexacarboxylic acid derivative selected from the group consisting of cyclohexane-1,2,3,4,5,6-hexacarboxylic acid and water-soluble salts thereof, and a major amount of pharmacologically acceptable excipients.

Cyclohexane-1,2,3,4,5,6-hexacarboxylic acid can be produced by partial hydrogenation of phthalic acid to give 3,5-cyclohexadiene-1,2-dicarboxylic acid, further reaction with maleic acid anhydride to give bicyclo-2,2,2,7-octene-2,3,5,6-tetracarboxylic acid and catalytic oxidation of this intermediate stage to give cyclohexane-1,2,3,4,5,6-hexacarboxylic acid.

Such a method is described in French Patent No. 1,563,486. The acid can be converted in known manner by total or partial neutralization into the desired salts.

Instead of the free acid, its pharmacologically acceptable, water-soluble salts, for example, the alkali metal salts such as the sodium or potassium salts, the magnesium salts, the ammonium salts and substituted ammonium salts, such as lower alkylammonium and lower alkanolammonium salts, such as mono-, di- or tri-ethanol-ammonium salts can also be used. For pharmaceutical applications, both the partial salts, in which only a part of the acid proton is substituted by other cations, and full salts can be used, but partial salts which react substantially neutral in aqueous solution (pH 5 to 9) are preferred.

The dosage range of the cyclohexane-hexacarboxylic acid derivatives is variable and depends on the respective conditions, such as the type and severity of the disease, duration of the treatment, and the particular compound being utilized. Individual dosages can be from 0.05 to 500 mg per kg of the animal body weight. The preferred dose is 1 to 20 mg per kg of body weight, and can be administered up to 4 times daily. The higher doses are necessary for oral application, due to the limited resorption. In longer treatments, after initial higher doses, lower doses are normally required to maintain the desired effect.

Doses under 0.05 per kg of body weight have little effect on the pathological calcification or dissolution of hard tissue. Doses above 500 mg/kg of body weight may have toxic side effects in the long run. The cyclohexane-hexacarboxylic acid derivatives can be administered orally and, in hypertonic solution, subcutaneously, intramuscularly and intravenously in the form of tablets, pills, capsules or as injectable solutions. For animals the cyclohexane-hexacarboxylic acid derivatives can also be used as part of the feed or of feed additives.

The preferred dosage for these various methods of administration are, in mg/kg:

| | |
|---|---|
| Orally | 1 to 10 |
| Subcutaneously | 1 to 5 |
| Intramuscularly | 0.05 to 5 |
| Intravenously | 0.05 to 1 |

The cyclohexane-1,2,3,4,5,6-hexacarboxylic acid to be used according to the invention is generally added in the form of its alkali metal salts to the corresponding oral hygiene products and dentrifices, such as toothpastes, mouthwashes, tooth cleaning powders, mouth lozenges, chewing gum, and tooth treatment ointments in amounts of 0.01% to about 5% by weight. Oral hygiene products which are necessarily swallowed, like mouth lozenges and chewing gum, should only contain small amounts of up to about 1% by weight; those that are frequently swallowed by accident should not contain more than about 2.5% by weight. The highest amounts can be incorporated in tooth treatment ointments which are used locally by the dentist for the treatment of acute cases.

The pH value of the oral hygiene products and dentrifices according to the invention can range from 5 to 9. The lower limit should not be set lower for safety reasons, to prevent damage to the tooth enamel in a combination of unfortunate circumstances, despite the great safety in the treatment with cyclohexane-1,2,3,4,5,6-hexacarboxylic acid. The upper limit results from practical considerations, since it is not possible to produce alkaline products which are satisfactory in aroma and taste.

The suitability of the cyclohexane-1,2,3,4,5,6-hexacarboxylic acid derivatives to be used according to the invention for the therapeutic treatment of tartar results from its capacity of inhibiting even in small amounts crystallization in the precipitation of calcium apatite. Calcium-apatite, which is precipitated in the presence of cyclohexane-1,2,3,4,5,6-hexacarboxylic acid, is X-ray amorphous, in contrast to crystalline apatite which is usually formed without this addition.

In mouthwashes, a combination with the aqueous alcoholic solution of various types of essential oils, emulsifiers, wetting agents, antiseptics, astringents and tonicizing drug extracts, caries-preventing additives, and flavor correctives can be readily used. Hydrogen peroxide-containing mouthwashes, which can be used to prevent paradontosis, can also be provided with the additive according to the invention.

The toothpastes are generally pasty preparations of water, thickeners, wetting and foaming agents, moisturizers, abrasives, scouring and cleaning agents, aromas, flavor corrective, antiseptic and other valuable oral-cosmetic substances. The cleaning agents and other additives to be used in the toothpastes according to the invention should, as far as possible, be free of soluble calcium in order not to impair the tartar-preventing action of cyclohexane-1,2,3,4,5,6-hexacarboxylic acid.

The cleaning agents are, therefore, primarily secondary calcium phosphate, sodium metaphosphate, precipitated silicas, aluminum oxide, aluminum silicates, calcium pyrophosphate, and finely dispersed synthetic resins, like melamine-urea-formaldehyde resins or poly-lower alkylmethacrylates. The content of cleaning agent in the toothpastes is generally between 25 and 60%. The wetting and foaming agents used are primarily soap-free anionic surface-active compounds, like fatty alcohol sulfates, e.g., sodium lauryl sulfate, monoglyceride sulfates, sodium lauryl sulfoacetate, sarcosides, taurides and other anionic surface-active compounds which do not influence the taste in amounts of 0.5% to 5%. For the production of the binder for the toothpastes, all thickeners that are customary for this purpose can be used, like hydroxyethyl cellulose, sodium carboxymethyl cellulose, tragacanth, carragheen, agar, gum arabic, as well as additional finely dispersed silicas. The moisturizers are primarily glycerin and sorbitol in amounts of up to about one-third of the total agent. The desired aroma and flavor can be achieved by the addition of essential oils, like peppermint, clover, wintergreen or sassafras oil, as well as sweetening agents, like saccharin, dulcin, dextrose, levulose, etc. In addition, caries-preventing additives, like fluorides or fluorphosphates can be used. The content of the tartar-preventing cyclohexane-1,2,3,4,5,6-hexacarboxylic acid to be used in the toothpastes according to the invention is between 0.5 and 5%, particularly 1% and 4%, related to the total mass of the toothpaste.

The effects that can be achieved with the new pharmaceutical or cosmetic preparations can be demonstrated by the tests and applications described in the following examples. These examples are illustrative of the practice of the invention without being limitative thereof in any respect.

EXAMPLE 1

Apatite Crystallization Delay Test in Vitro

Supersaturated solutions of $Ca^{++}$ and $HPO_4^{--}$ ions are relatively stable, but crystallize after the addition of an apatite nuclei according to the reaction $$5\,Ca^{++} + 3\,HPO_4^{--} + H_2O \rightarrow Ca_5(PO_4)_3OH + 4\,H^+$$

with the release of protons. The reaction can, therefore, be readily observed by titration with a base at a constant pH.

400 ml of 0.0008 molar $KH_2PO_4$ solution were mixed with 45 ml of a 0.012 molar $CaCl_2$ solution, and the clear solution was standardized with KOH to a pH of 7.4, after being brought to a temperature of 35°C. After 30 minutes during which time the pH did not change, a suspension of 100 mg of hydroxyl apatite in 50 ml of $H_2O$ was added. The crystallization set in immediately and was followed by "pH-Stat" titration with 0.05 N KOH.

If a small amount of cyclohexane-1,2,3,4,5,6-hexacarboxylic acid was added to the solution before the apatite was added, the crystallization was greatly delayed. The inhibition of the crystallization was 75% after 8 hours at a concentration of 4 mg/l, and 90% after 8 hours at a concentration of 20 mg/l.

EXAMPLE 2

Retardation of the Dissolution of Calcium Hydroxyl Apatite

The dissolution of calcium hydroxyl apatite crystals in a solution buffered to pH 7.0 is delayed by small amounts of cyclohexane-1,2,3,4,5,6-hexacarboxylic acid. This can be shown by the following test.

50 ml of a 0.1 molar sodium barbital solution (prepared by dissolving 18.42 gm of 5,5-diethyl-barbituric acid with 0.1 mol of NaOH in 1 liter of water) were mixed with a weighed amount of cyclohexane-1,2,3,4,5,6-hexacarboxylic acid. The solution was diluted to 450 ml and brought to a pH of 7.0 with 0.1 N HCl. Subsequently, 5.78 gm of KCl were added and the solution is brought to exactly 500 ml.

1 gm of hydroxyl apatite was added to the buffer solution thus prepared, and the suspension was stirred in a closed bottle for 15 hours at 25°C. After filtration through a Millipore filter (pore width 1 to 2 μm), the clear solution was concentrated to 100 ml, and calcium oxalate was precipitated with the addition of 20 ml of a saturated sodium oxalate solution. The precipitate was centrifuged off. The residue was brought into solution with 10 ml of fuming nitric acid and the calcium in the aqueous solution was titrated by complexometry.

The following values were obtained from this test.

| Cyclohexane-hexacarboxylic acid mg | Calcium mg/l | Reduction of the Dissolution % |
|---|---|---|
| 0.0 | 20.0 | — |
| 5.0 | 15.0 | 25 |
| 10.0 | 10.9 | 45.5 |
| 20.0 | 9.3 | 53.5 |

With a concentration of 40 mg of cyclohexane-1,2,3,4,5,6-hexacarboxylic acid in one liter of the apatite suspension, a retardation of the dissolution of more than 50% was thus achieved.

EXAMPLE 3

Prevention of Hardening of the Aorta in Rats

The effectiveness of cyclohexane-1,2,3,4,5,6-hexacarboxylic acid in preventing abnormal calcium deposits in vivo in rats can be demonstrated as follows.

This test was based on the observation that high doses of vitamin $D_3$ cause a considerable hardening of the aorta in rats. 30 Female rats weighing 150 to 200 gm each were divided into three groups of 10 animals each. They received during the test period a normal diet and tap water ad libitum. One group of 10 animals (control) received no further treatment. Another group of the animals received from the 3rd to the 7th day, 75,000 units of vitamin $D_3$ daily through a stomach sound. The third group likewise received from the 3rd to the 7th day, 75,000 units of vitamin $D_3$ daily through a stomach sound and, in addition, likewise orally, 10 mg per kg of cyclohexane-1,2,3,4,5,6-hexacarboxylic acid from the 1st to the 10th day. After ten days the animals were sacrificed and their aortas prepared and dried for 12 hours at 105°C. After determination of the dry weight, the aortas were ashed; the residue was dissolved, and the calcium was determined by flame photometry. The treatment with cyclohexane-1,2,3,4,5,6-hexacarboxylic acid reduced the vitamin $D_3$ induced hardening of the aortas of rats considerably.

EXAMPLE 4

Pharmaceutical Compositions

For the production of a pharmaceutical preparation in the form of a capsule, the known methods of preparation are followed to prepare capsules having a content per capsule as follows:

| | |
|---|---|
| Cyclohexane-1,2,3,4,5,6-hexacarboxylic acid | 100 mg |
| Starch | 20 mg |
| Sodium laurylsulfate | 1 mg |

For the preparation of a tablet, the following recipe was utilized per tablet:

| | |
|---|---|
| Cyclohexane-1,2,3,4,5,6-hexacarboxylic acid | 100 mg |
| Lactose | 100 mg |
| Starch | 47 mg |
| Magnesium stearate | 3 mg |

EXAMPLE 5

Cosmetic Preparations

When cyclohexane-hexacarboxylic acid or its pharmaceutically acceptable salts are used in oral hygiene products and dentifrices, the formation of tartar is considerably reduced. The pH value of the mouthwashes or toothpastes according to the invention can vary within the limits of 5 to 9.

The following recipes are suitable as a basic formula for toothpastes.

|     |                                          | Parts by Weight |
| --- | ---------------------------------------- | --------------- |
| (a) | Glycerin                                 | 60.0            |
|     | Water                                    | 13.5            |
|     | Sodium carboxymethyl cellulose           | 0.6             |
|     | Silica zero gel                          | 20.0            |
|     | Sodium laurylsulfate                     | 2.0             |
|     | Essential oils                           | 1.0             |
|     | Sweetening agent                         | 0.4             |
|     | Cyclohexane-1,2,3,4,5,6-hexa-carboxylic acid | 2.5         |
| (b) | Glycerin                                 | 30.0            |
|     | Water                                    | 18.5            |
|     | Sodium carboxymethyl cellulose           | 1.0             |
|     | Aluminum hydroxide                       | 44.0            |
|     | Sodium laurylsulfate                     | 1.0             |
|     | Pyrogenic silica                         | 1.5             |
|     | Essential oils                           | 1.5             |
|     | Sweetening agent                         | 0.5             |
|     | Cyclohexane-1,2,3,4,5,6-hexa-carboxylic acid | 2.0         |

Suitable as a basic formulation for mouthwashes is the following recipe:

|                                              | Parts by Weight |
| -------------------------------------------- | --------------- |
| Ethyl alcohol                                | 19.5            |
| Glycerin                                     | 7.5             |
| Water                                        | 70.0            |
| Essential oils                               | 0.2             |
| Sodium laurylsulfate                         | 0.1             |
| Antiseptic (chlorothymol)                    | 0.1             |
| Sweetening agent                             | 0.1             |
| Cyclohexane-1,2,3,4,5,6-hexa-carboxylic acid | 2.5             |

By regular use of the mouthwashes and/or toothpastes containing the sodium salts of cyclohexane-1,2,3,4,5,6-hexacarboxylic acid, the formation of tartar could be considerably reduced. The formation of hard compact plaque on the teeth was to a great extent prevented.

The preceding specific embodiments are illustrative of the practice of the invention. It is to be understood, however, that other expedients known to those skilled in the art or discussed herein may be employed without departing from the spirit of the invention or the scope of the appended claims.

We claim:

1. A method for alleviating conditions caused by the abnormal deposition or dissolution of difficultly soluble calcium salts in the body of warm-blooded animals having said conditions which consists of administering orally or parenterally to said warm-blooded animals, from 0.05 to 500 mg/kg of the animal body weight of at least one pharmacologically acceptable cyclohexane-hexacarboxylic acid derivative selected from the group consisting of cyclohexane-1,2,3,4,5,6-hexacarboxylic acid and water-soluble salts thereof.

2. A composition for oral hygiene useful for the removal of tartar consisting essentially of from 0.01% to 5% by weight of at least one cyclohexane-hexacarboxylic acid derivative selected from the group consisting of cyclohexane-1,2,3,4,5,6-hexacarboxylic acid and its alkali metal salts, in admixture with an orally acceptable excipient.

3. A method for alleviating conditions caused by the deposition of difficultly soluble calcium salts on the teeth of warm-blooded animals having said conditions which consists of topically administering to the teeth of said warm-blooded animals, a safe but effective amount of at least one pharmacologically acceptable cyclohexane-hexacarboxylic acid derivative selected from the group consisting of cyclohexane-1,2,3,4,5,6-hexacarboxylic acid and water-soluble salts thereof.

* * * * *